US010582606B2

(12) United States Patent
Laurisch et al.

(10) Patent No.: US 10,582,606 B2
(45) Date of Patent: Mar. 3, 2020

(54) NOZZLE FOR A PLASMA ARC TORCH

(71) Applicant: Kjellberg-Stiftung, Finsterwalde (DE)

(72) Inventors: Frank Laurisch, Finsterwalde (DE); Volker Krink, Finsterwalde (DE); Timo Grundke, Finsterwalde (DE)

(73) Assignee: Kjellberg-Stiftung, Finsterwalde (DE)

( * ) Notice: Subject to any disclaimer, the term of this patent is extended or adjusted under 35 U.S.C. 154(b) by 320 days.

(21) Appl. No.: 15/548,434

(22) PCT Filed: Jan. 27, 2016

(86) PCT No.: PCT/EP2016/051689
§ 371 (c)(1),
(2) Date: Aug. 3, 2017

(87) PCT Pub. No.: WO2016/124463
PCT Pub. Date: Aug. 11, 2016

(65) Prior Publication Data

US 2018/0020533 A1 Jan. 18, 2018

(30) Foreign Application Priority Data

Feb. 3, 2015 (DE) ........................ 10 2015 101 532
Mar. 19, 2015 (EP) .................................... 15159816

(51) Int. Cl.
*B23K 10/00* (2006.01)
*H05H 1/34* (2006.01)
*H05H 1/28* (2006.01)

(52) U.S. Cl.
CPC ................. *H05H 1/34* (2013.01); *H05H 1/28* (2013.01); *H05H 2001/3478* (2013.01)

(58) Field of Classification Search
CPC .... H05H 1/34; H05H 1/28; H05H 2001/3478; H05H 1/26
USPC ......... 219/121.49, 121.48, 121.5, 121.51, 75
See application file for complete search history.

(56) References Cited

U.S. PATENT DOCUMENTS

| | | | | |
|---|---|---|---|---|
| 8,941,026 B2 | 1/2015 | Krink et al. | | |
| 2004/0200810 A1* | 10/2004 | Brandt | H05H 1/28 | 219/121.49 |
| 2006/0289398 A1* | 12/2006 | Cook | B23K 10/00 | 219/121.5 |
| 2011/0108528 A1 | 5/2011 | Laurisch et al. | | |
| 2011/0284502 A1* | 11/2011 | Krink | H05H 1/28 | 219/121.5 |
| 2016/0221108 A1* | 8/2016 | Hoffa | B23K 10/006 | |

FOREIGN PATENT DOCUMENTS

| | | |
|---|---|---|
| DE | 102007005316 | 3/2008 |
| DE | 102009060849 | 7/2011 |

OTHER PUBLICATIONS

PCT/EP2016/051689; PCT International Search Report of the International Searching Authority dated Mar. 8, 2016.

* cited by examiner

*Primary Examiner* — Mark H Paschall
(74) *Attorney, Agent, or Firm* — Renner, Otto, Boisselle & Sklar, LLP

(57) ABSTRACT

Nozzle for a liquid-cooled plasma arc torch head, and an assembly of a nozzle holder and such a nozzle and plasma arc torch head, and a plasma arc torch with the same.

23 Claims, 6 Drawing Sheets

NOZZLE FOR A PLASMA ARC TORCH

The present application is a U.S. National Stage Application based on and claiming benefit and priority under 35 U.S.C. § 371 of International Application No. PCT/EP2016/051689, filed 27 Jan. 2016, which in turn claims benefit of and priority to European Application No. 15159816.6 filed 19 Mar. 2015, and German Application No. 10 2015 101 532.3 filed 3 Feb. 2015, the entireties of which are hereby incorporated herein by reference.

The present invention relates to nozzles for a liquid-cooled plasma arc torch head, an assembly of a nozzle holder, and a nozzle for a liquid-cooled plasma arc torch head, a plasma arc torch head and a plasma arc torch with such an assembly.

DE 10 2009 006 132 B4 discloses a nozzle for a liquid-cooled plasma arc torch, which comprises a body with an overall axial length, an inner surface and an outer surface, a front and a rear end and a nozzle opening at the front end. Beginning at the rear (from the rear end), the known nozzle first includes a receiving portion for receiving it in a nozzle holder and then a groove, in which an O-ring is or can be disposed. In certain cases, this can involve the disadvantage that, when the nozzle is installed in a plasma torch head, the space for the coolant, especially cooling water, is restricted towards the nozzle holder, so that the contact area between the coolant and the nozzle is limited towards the rear.

Nozzles are also known in which there is a groove with an O-ring that is or can be disposed in it, directly at the rear end thereof. This for its part has the disadvantage that the O-ring can be damaged when being placed in a nozzle holder to plug the nozzle into the nozzle holder, for example if there are elements in the nozzle holder such as projections, as described in DE 10 2007 005 316 B4, for guiding the nozzle in a defined manner.

The present invention is thus based on the problem of configuring the known nozzle in such a way that damage to the O-ring is avoided or at least reduced when a nozzle is placed in a nozzle holder, and at the same time a larger area is provided which can come into contact with coolant.

This problem is solved according to a first aspect of the invention by a nozzle for a liquid-cooled plasma arc torch head, comprising a body with an overall axial length L, an inner surface and an outer surface, a front and a rear end and a nozzle opening at the front end, wherein the outer surface of the body, beginning at the rear end, has a substantially cylindrical first portion with an axial length L1, in which at the rear end of the body there is a groove extending preferably in the circumferential direction for an O-ring or with an O-ring disposed in it, which is delimited towards the rear end of the body by a projection which defines an external diameter D11 of the body, and at the front end there is a centering surface for a nozzle holder, which defines an external diameter D12 of the body, and has a second portion with an axial length L2 adjoining it towards the front end, which defines an axial stop face for a nozzle holder at the boundary to the first portion, which defines an external diameter D21 of the body and tapers substantially conically, at least in a part-portion towards the front end of the body, wherein D12-D11≥1.5 mm and/or (D12-D11)/D12≥0.07.

A portion tapering conically or in a cone shape is in particular intended to mean a portion in which, if one joins the rearmost point (edge) of the portion to the frontmost point (edge) of the portion, the line runs parallel to the longitudinal axis of the nozzle or with a minimal deviation of more than ±15°.

In addition, an external diameter is in particular intended to mean the following:

The external diameter which a virtual circle with the radius of the plane formed perpendicularly to the longitudinal axis of the nozzle would form between the point of intersection of the plane and the longitudinal axis and the greatest distance from the outer surface of the nozzle.

The possibility exists that a complete circle is formed in the plane by the outer confines of the nozzle, but also the possibility that only a part-portion or only individual portions are present, and the circle and also the diameter only exist virtually.

Grooves or other indentations or interruptions may be provided in the surface of the nozzle.

According to a further aspect, this problem is solved by a nozzle for a liquid-cooled plasma arc torch, comprising a body with an overall axial length L, an inner surface and an outer surface, a front and a rear end and a nozzle opening at the front end, wherein the outer surface of the body, beginning at the rear end, has a substantially cylindrical first portion with an axial length L1, in which at the rear end of the body there is a groove extending preferably in the circumferential direction for an O-ring or with an O-ring disposed in it, which is delimited towards the rear end of the body by a projection which defines an external diameter D11 of the body, and at the front end there is a centering surface for a nozzle holder, which defines an external diameter D12 of the body, and has a second portion with an axial length L2 adjoining it towards the front end, which defines an axial stop face for a nozzle holder at the boundary to the first portion, which defines an external diameter D21 of the body and tapers substantially conically, at least in a part-portion towards the front end of the body, especially in accordance with claim 1, wherein for the length L12 of the distance between the axial stop face of the second portion and the closest edge line of the groove and the length L13 of the distance between said edge line and the rear end of the body, the rule is L12/L13≥3, preferably ≥3.3 and/or wherein for the length L12 of the distance between the axial stop face of the second portion and the closest edge line of the groove and the length L of the first portion, the rule is L12/L1≥0.75 and particularly preferably L12/L1≥0.77, and/or wherein the rule is D12/L1≤2.3.

According to a further aspect, this problem is solved by an assembly of a nozzle holder and a nozzle according to any of claims 1 to 16.

Finally, this problem is solved by a liquid-cooled plasma arc torch head comprising a nozzle according to any of claims 1 to 16 or an assembly according to any of claims 17 to 19.

In the case of the nozzles, it may be contemplated that the external diameter D12 is the largest external diameter of the first portion.

In addition, it may be contemplated that the external diameter D12 is the largest external diameter of the second portion.

It is advantageous for the largest external diameter of the first portion to be smaller than the largest external diameter of the second portion.

It is helpful if there is at least one further groove in the outer surface of the first portion.

In particular, it can be contemplated that the at least one further groove has a cross-sectional area of at least 3 $mm^2$. The term "cross-sectional area" is intended to mean the area perpendicular to the longitudinal extent of the groove.

In addition, the further groove advantageously extends in the circumferential direction of the body.

In particular, it may be contemplated in this context that the further groove extends in the circumferential direction of the body over an angle in the range from approximately 20° to approximately 360°.

According to one particular embodiment, the further groove is delimited towards the front end of the body by a front projection which runs in the circumferential direction of the body and whose outer surface is formed by the centering surface, and/or the further groove 2.11 is delimited towards the rear end of the body by a rear projection running in the circumferential direction of the body.

In particular, it may be contemplated in this context that the front projection defines an external diameter or a local largest external diameter of the body and the rear projection defines an external diameter or a local largest external diameter, wherein the external diameters or local largest external diameters of the front and rear projections are the same size or differ from one another by a maximum of approximately 0.2 mm.

According to a further particular embodiment of the present invention, there is/are in the second portion of the outer surface at least one groove and/or drilled hole and/or indentation and/or other opening and/or a channel, which is/are in fluid connection with the first portion of the outer surface.

It is advantageous if there is/are in the second portion of the outer surface at least one groove and/or drilled hole and/or indentation and/or other opening and/or a channel, which is/are in fluid connection with the further groove in the first portion of the outer surface.

It is helpful if on the outer surface of the body between the groove for an O-ring or with an O-ring disposed in it and the further groove there is a peripheral receiving region for connecting to a nozzle holder.

Alternatively, it may be contemplated that on the outer surface of the body between the groove for an O-ring or with an O-ring disposed in it and the further groove there is a peripheral receiving region for connecting to a nozzle holder.

It is convenient for the receiving region to have at least one radial projection and/or at least one radial indentation. The radial projections and/or indentations may extend merely over a limited angle in the circumferential direction and/or be arranged equidistantly.

According to a particular embodiment of the assembly, the nozzle holder has on its connecting side a cylinder wall with a retaining ring surface resting on the axial stop face of the nozzle and with an inner surface resting on the centering surface of the nozzle, preferably with little or no play.

On the inner surface of the cylinder wall, the nozzle holder advantageously has a receiving region complementary to the receiving region of the nozzle.

Finally, the present invention provides both a liquid-cooled plasma arc torch head and a liquid-cooled plasma arc torch, each comprising a nozzle according to any of claims 1 to 16 or an assembly according to any of claims 17 to 19.

The invention is based on the surprising finding that thanks to the specific design of the outer surface of the nozzle, the groove with the O-ring can be disposed as far as possible towards the rear end of the nozzle, without the O-ring's being damaged in the process, and at the same time a larger area is provided which can come into contact with coolant. Furthermore, the centering of the nozzle in the nozzle holder is further improved.

For example, a first portion of the body of the nozzle which is as long as possible enables good cooling of the transition point between a nozzle holder and the nozzle and good centering of the nozzle in the nozzle holder. Good cooling of the transition point is necessary when igniting the pilot arc, which burns between the electrode and the nozzle of a plasma arc torch. It is also necessary when the plasma arc torch is operated indirectly. In the latter case, the plasma arc often burns with a high electric power between the electrode and the nozzle, such as several kW. Currents of more than 100 A can flow in the process.

Further features and advantages of the invention will become clear from the enclosed claims and the following description, in which two embodiments are explained in detail with reference to the schematic drawings. There, FIG. 1 shows a side view (left) and a rear view (right) of a nozzle according to a first particular embodiment of the present invention;

Figure 4:
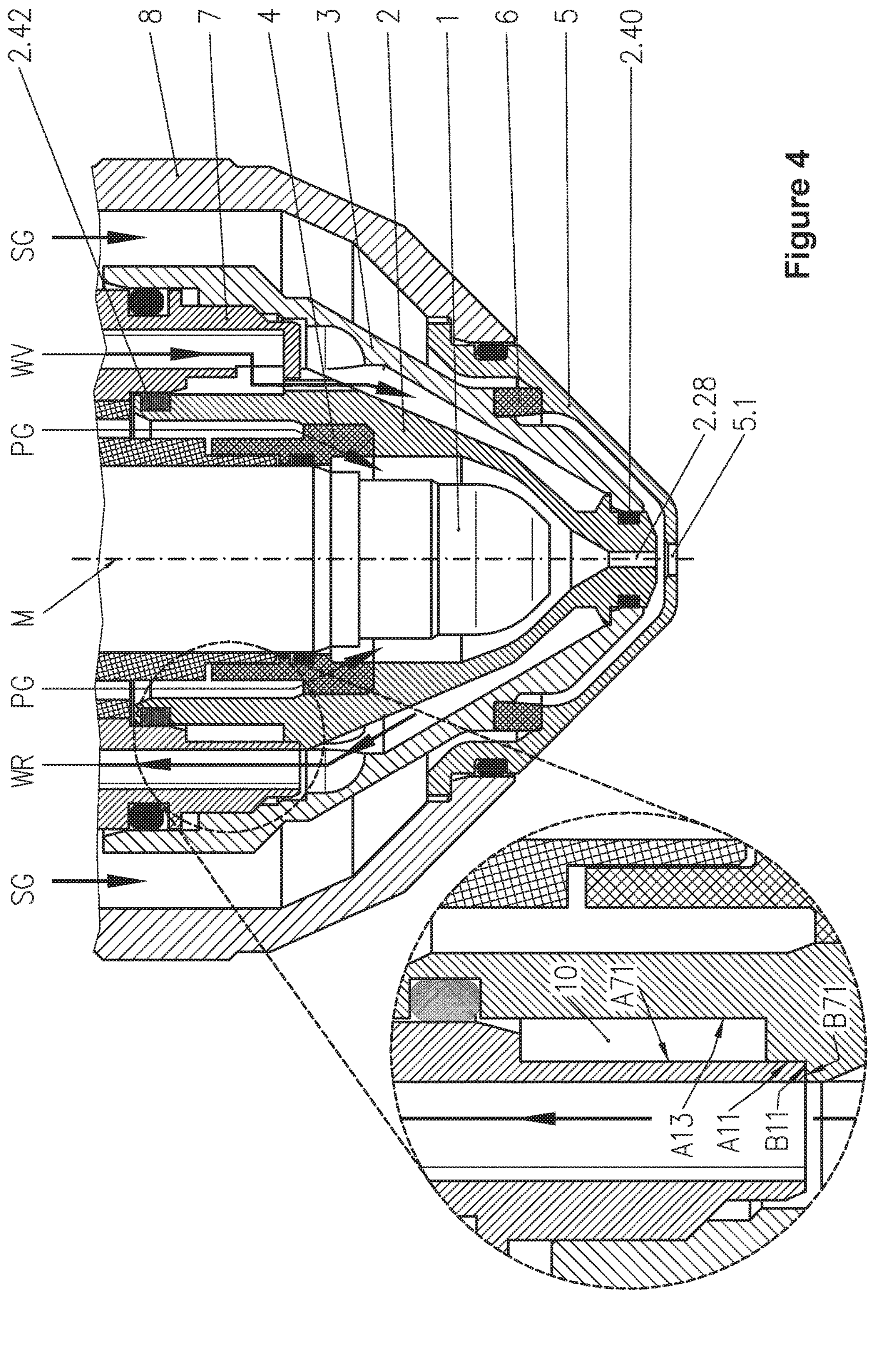
FIG. 4 shows a side view of a plasma arc torch head with the nozzle of FIG. 1.
Figure 5:
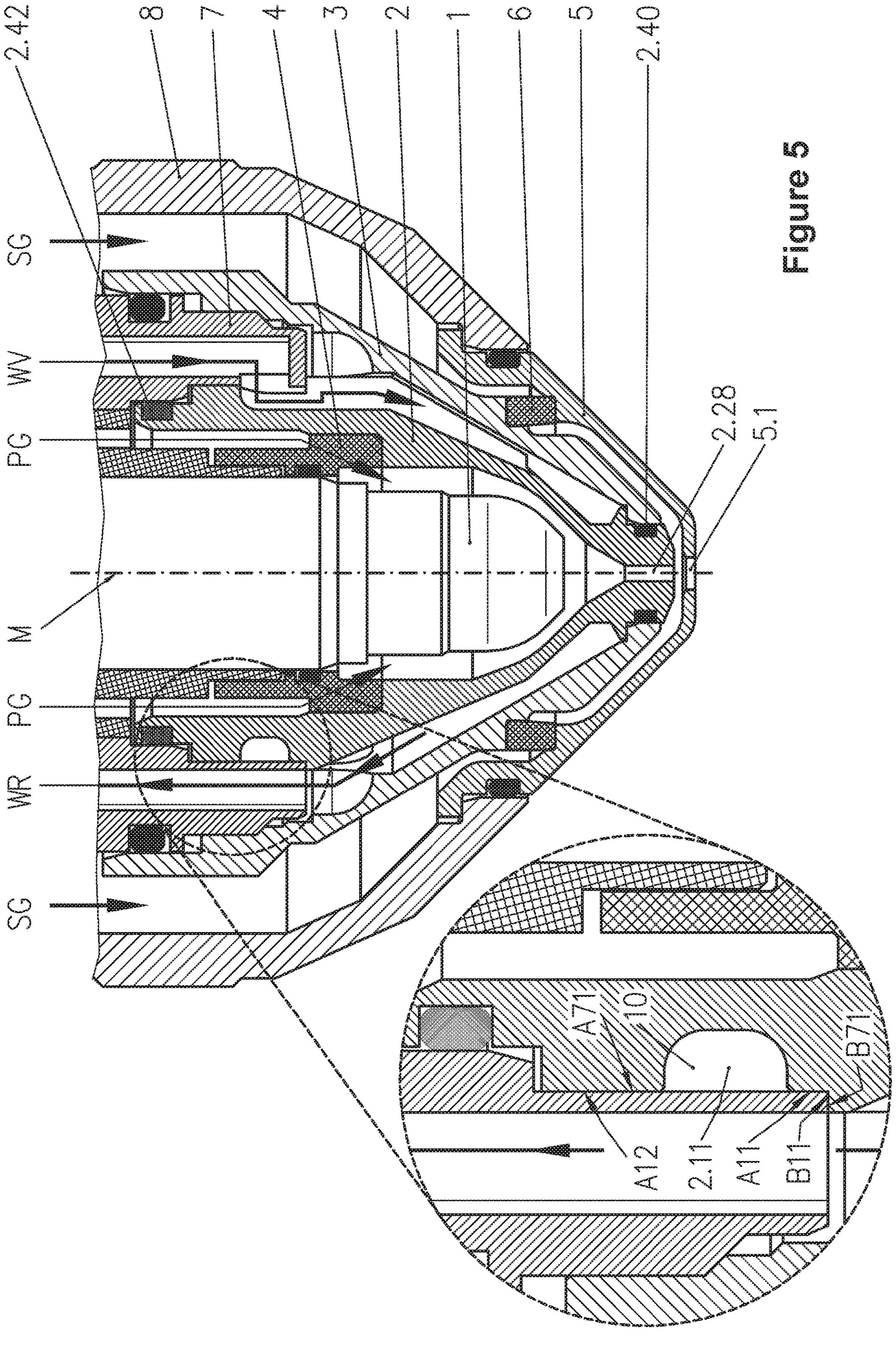
FIG. 5 shows a side view of a plasma arc torch head with the nozzle of FIG. 2.
Figure 6:
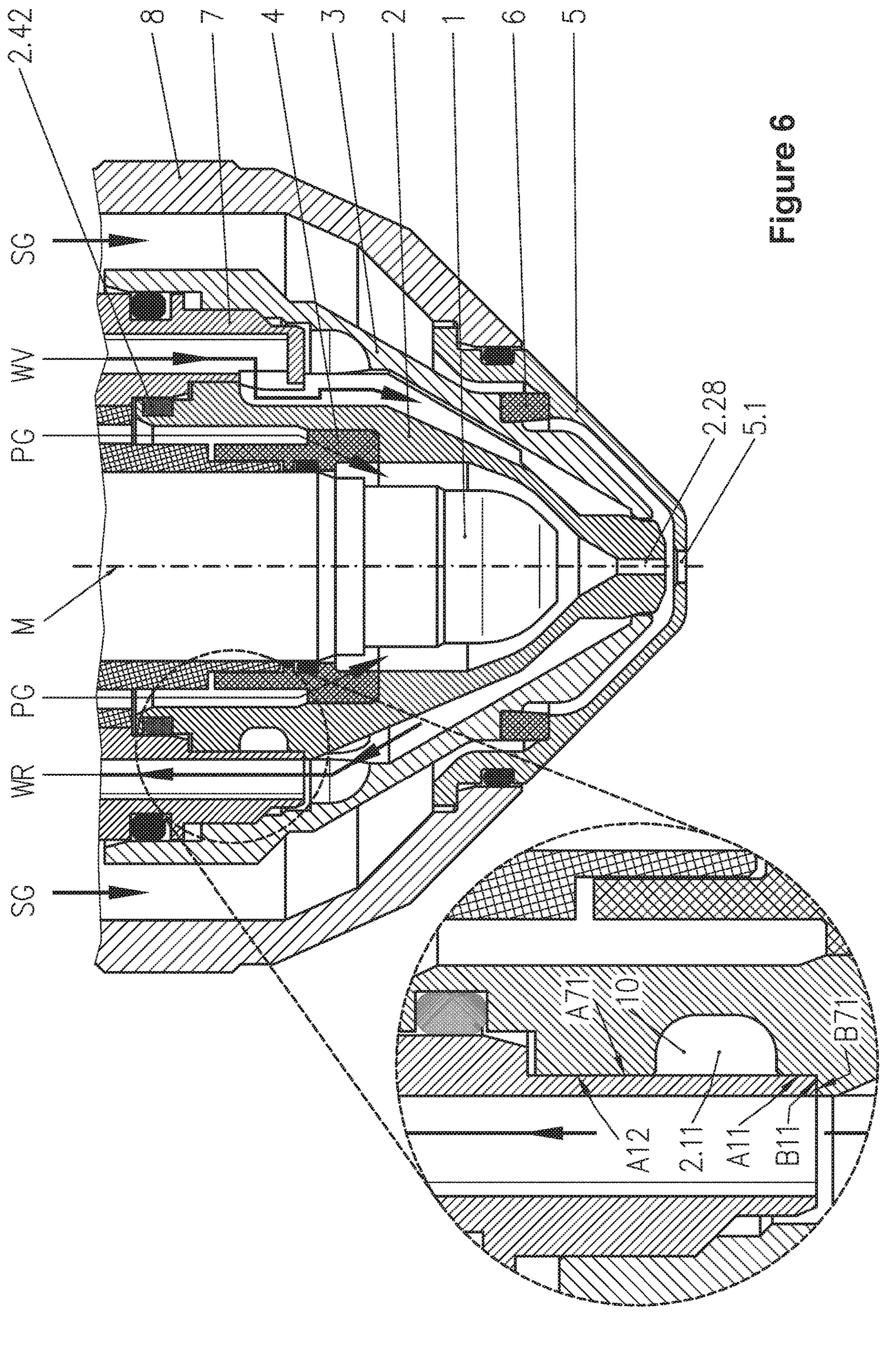
FIG. 6 shows a side view of a plasma arc torch head with the nozzle of FIG. 3.

The respective enlarged excerpts from the drawings in FIGS. 4 to 6 show details of the assembly of the nozzle and of a nozzle holder.

Figure 1:
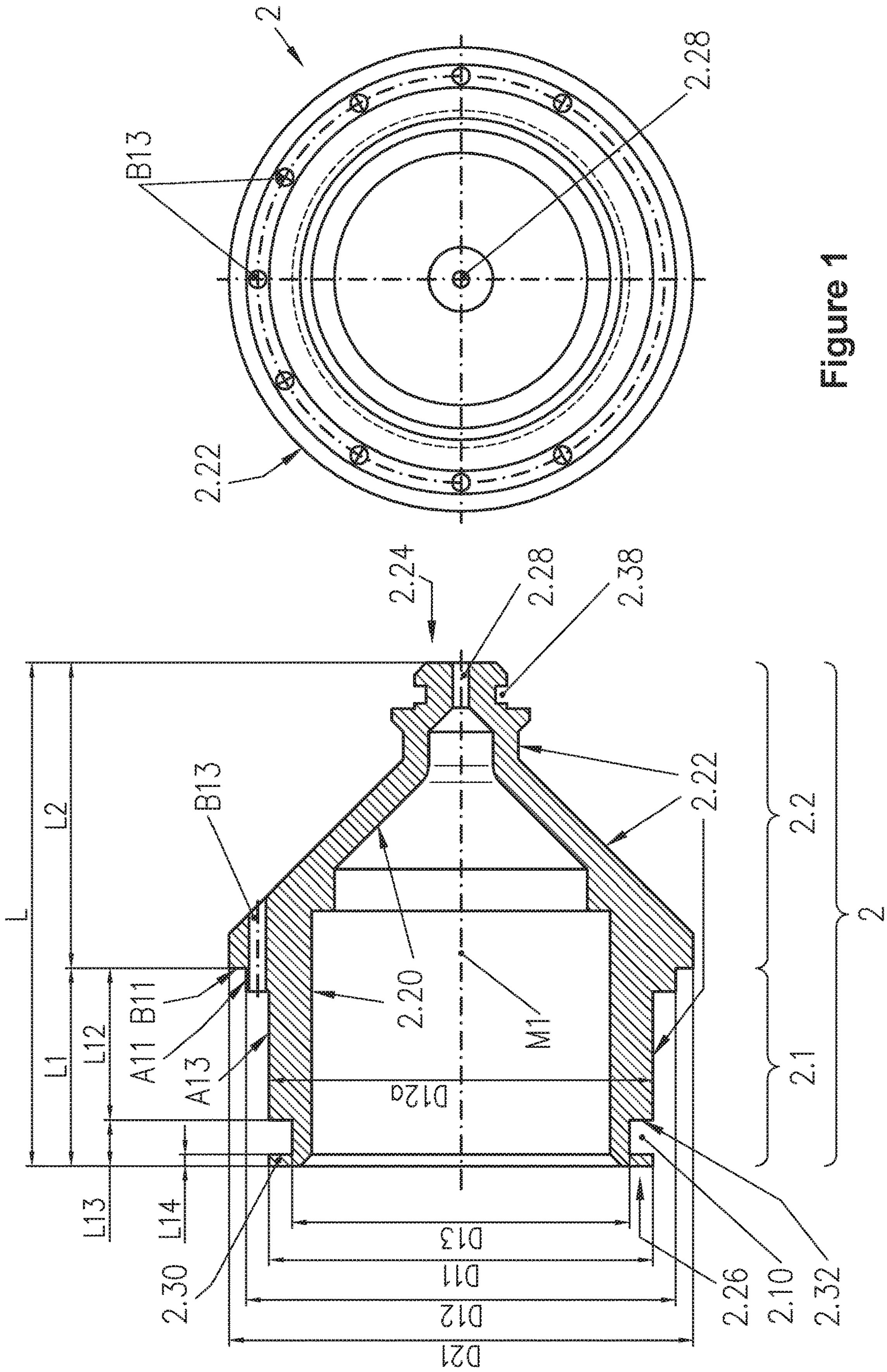

The nozzle for a liquid-cooled plasma arc torch shown in FIG. 1 comprises a body 2 with an overall axial length L, i.e. along the longitudinal axis M1, an inner surface 2.20 and an outer surface 2.22, a front end 2.24 and a rear end 2.26 and a nozzle opening 2.28 at the front end 2.24. In addition, the body 2 has a groove 2.38 at its front end 2.24. In the groove 2.38, when the nozzle is fitted in the plasma arc torch, there is an O-ring 2.40 (see FIGS. 4 and 5) to seal the space between the nozzle and the nozzle cap 3 (see FIGS. 4 and 5). Proceeding from the rear end 2.26, the outer surface 2.22 of the body 2 has a substantially cylindrical first portion 2.1 with an axial length L1, in which at the rear end 2.26 of the body 2 there is a groove 2.10 extending in the circumferential direction for an O-ring (not shown), which is delimited towards the rear end 2.26 of the body 2 by a projection 2.30 which defines an external diameter D11 of the body 2, and a centering surface A11 at the front end 2.24 for a nozzle holder (not shown), which defines an external diameter D12 of the body 2. In addition, the outer surface has a second portion 2.2 with an axial length L2 directly adjoining the first portion 2.1 towards the front end 2.24, which has an axial stop face B11 for a nozzle holder (not shown) at the boundary to the first portion 2.1, which defines an external diameter D21 of the body 2, and tapers substantially conically, at least in a part-portion towards the front end 2.24 of the body. Between the boundary between the first portion 2.1 and the second portion 2.2 and the groove 2.10, the first portion 2.1 of the outer surface 2.22 thus has an outer surface A13, especially a large outer surface A13, which can come into contact with a coolant when the nozzle is fitted in a plasma arc torch head (not shown), as a result of which the cooling is improved.

Since the diameter D12 in this embodiment is 22.8 mm and the diameter D11 in this embodiment is 20.8 mm, the difference is D12-D11=2 mm. Furthermore, the result for (D12-D11)/(D12)=0.088.

It also becomes clear from FIG. 1 that the external diameter D12 is the largest external diameter of the first portion 2.1 and the external diameter D21 is the largest external diameter of the second portion 2.2, the largest external diameter D12 of the first portion 2.1 being smaller than the largest external diameter D21 of the second portion 2.2. In addition, the external diameter of the body 2 in FIG. 1 to the left (D11) and right (D12*a*) of the groove 2.10 is identical, which means D11=D12*a*.

Furthermore, in the second portion 2.2 of the outer surface 2.22 there is a channel B13, which is in fluid connection with the first portion 2.1 of the outer surface 2.22. The channel B13 can also extend at least partially in the first portion 2.1.

With L12=8.2 mm, L13=2.3 mm and L1=10.5 mm, the result for L12/L13=8.2 mm/2.3 mm=3.565 and L12/L1=0.781 and for D12/L1=2.171.

Figure 2:
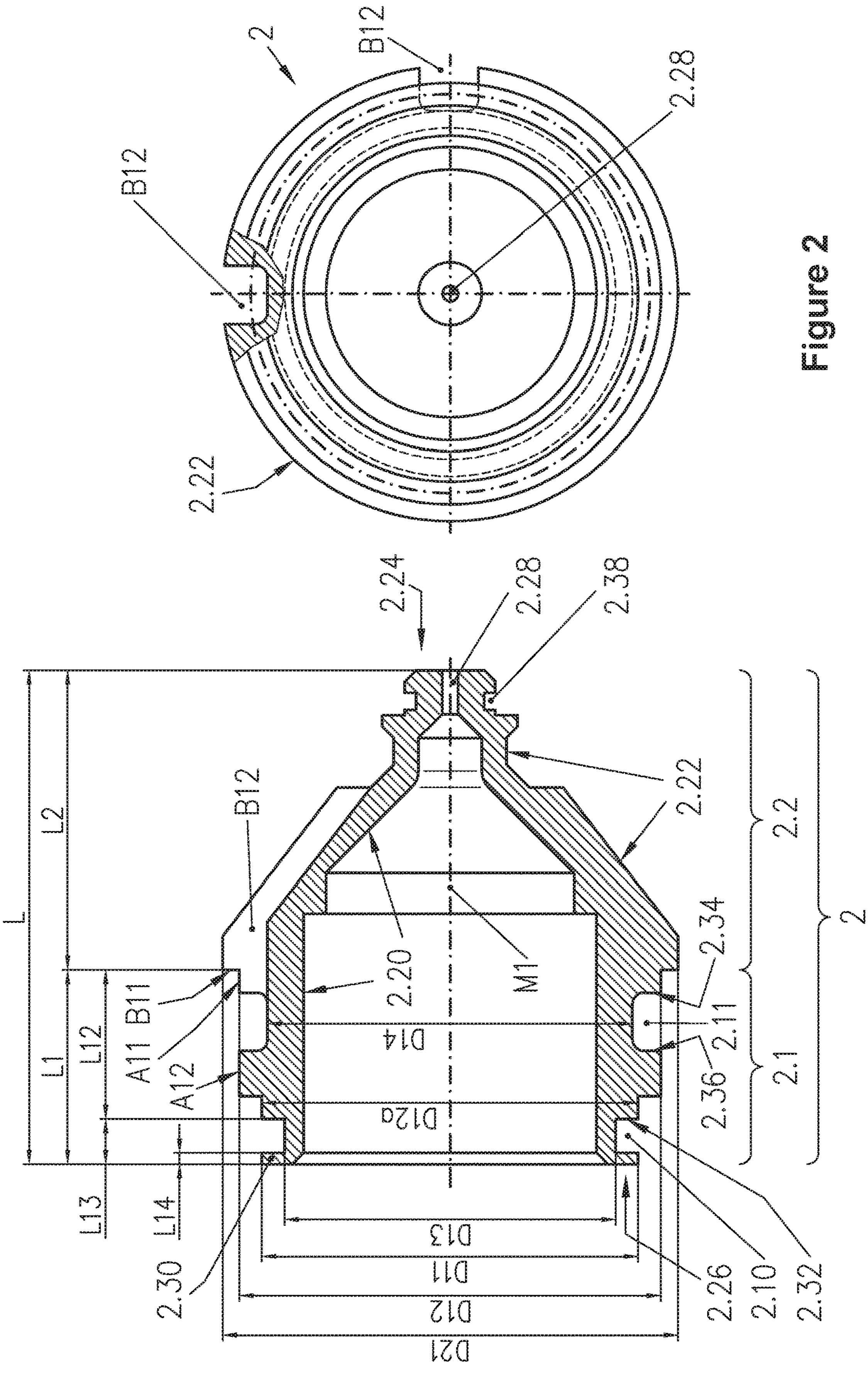
FIG. 2 shows a side view (left) and a rear view (right) of a nozzle according to a further particular embodiment of the present invention.

FIG. 2 shows a nozzle for a liquid-cooled plasma arc torch head (not shown), which comprises a body 2 with an overall axial length L, an inner surface 2.20 and an outer surface 2.22, a front end 2.24 and a rear end 2.26 and a nozzle opening 2.28 at the front end 2.24. In addition, the body 2 has a groove 2.38 at its front end 2.24. In the groove 2.38, when the nozzle is fitted in the plasma arc torch, there is an O-ring 2.40 (see FIGS. 4 and 5) to seal the space between the nozzle and the nozzle cap 3 (see FIGS. 4 and 5). Proceeding from the rear end 2.26, the outer surface 2.22 of the body 2 has a substantially cylindrical first portion 2.1 with an axial length L1, in which at the rear end 2.26 of the body 2 there is a groove 2.10 extending in the circumferential direction for an O-ring (not shown), which is delimited towards the rear end 2.26 of the body 2 by a projection 2.30 which defines an external diameter D11 of the body 2, and a centering surface A11 at the front end 2.24 for a nozzle holder (not shown), which defines an external diameter D12 of the body 2. In addition, the outer surface 2.22 has a second portion 2.2 with an axial length L2 adjoining directly towards the front end 2.24, which has an axial stop face B11 for a nozzle holder at the boundary to the first portion 2.1, which defines an external diameter D21 of the body 2, and tapers substantially conically, at least in a part-portion towards the front end 2.24 of the body 2. With regard to the dimensions D12 and D11, the same values and ratios or differences apply as with regard to the nozzle shown in FIG. 1. In the outer surface 2.22 of the first portion 2.1, there is, however, a further groove 2.11. That preferably has a cross-sectional area of at least 3 $mm^2$. In addition, it advantageously extends in the circumferential direction of the body 2. The further groove 2.11 is delimited towards the front end 2.24 of the body 2 by a front projection 2.34 which runs in the circumferential direction of the body 2 and whose outer surface is formed by the centering surface A11, and the further groove 2.11 is delimited towards the rear end 2.26 of the body 2 by a rear projection 2.36 running in the circumferential direction of the body 2, the outer surface of which is formed by the area or centering surface A12. The same values apply to the nozzle shown in FIG. 2 as to L12/L13, L12/L1 and D12/L1.

As can also be seen from FIG. 2, the front projection 2.34 defines a local largest external diameter D12 of the body 2, and the rear projection 2.36 defines a local largest external diameter D12. In other words, the local largest external diameters of the front and rear projections 2.34 and 2.36 are the same size in this example. The local largest external diameters of the front and rear projections do not, however, need to be the same size. As a rule, however, the rear projection 2.36 should not be larger than the front projection 2.34. The front and rear projections 2.34 and 2.36 with the identical external diameter D12 mean that in this nozzle there are two contact surfaces, which are in contact with a nozzle holder (not shown) when the nozzle is fitted. These are the centering surface A11 and the area or centering surface A12.

As can likewise be seen from FIG. 2, the second portion 2.2 has a groove B12, which is in fluid connection with the further groove 2.11. The groove B12 can also extend at least partially in the first portion 2.1.

Figure 3:
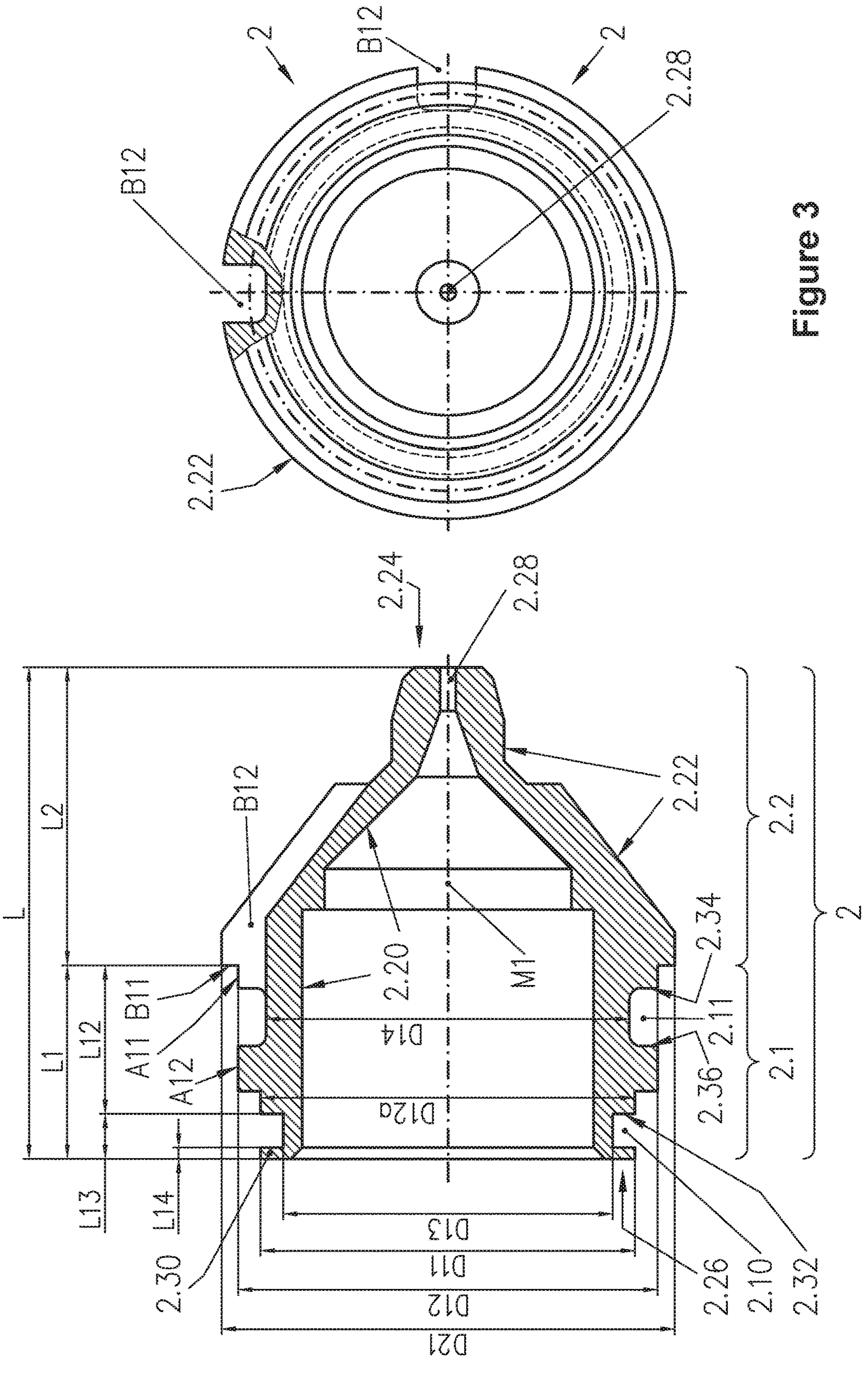
FIG. 3 shows a side view (left) and a rear view (right) of a nozzle according to a further particular embodiment of the present invention.

FIG. 3 shows a nozzle for a liquid-cooled plasma arc torch with a body 2 which has an overall axial length L, i.e. along the longitudinal axis M1, an inner surface 2.20 and an outer surface 2.22, a front end 2.24 and a rear end 2.26 and a nozzle opening 2.28 at the front end 2.24. Beginning at the rear end 2.26, the outer surface 2.22 of the body 2 has a first portion 2.1 with the same features as the first portion 2.1 of the nozzle shown in FIG. 2 and a second portion 2.2 with an axial length L2 directly adjoining the first portion 2.1 towards the front end 2.24. The second portion 2.2, especially the front end 2.24, is designed differently by way of example. At the front end 2.24, in contrast to the body of FIG. 2, the body 2 does not have a groove 2.38. The nozzle from FIG. 3 is shown in FIG. 6 fitted in a plasma arc torch head. Here the seal for the space between the nozzle and the nozzle cap 3 is achieved by contact between the metallic surfaces of the nozzle and the nozzle cap 3. In addition, a different internal contour of the nozzle or of the body is shown by way of example. This nozzle can be used for indirect operation, for example.

FIG. 4 shows a liquid-cooled plasma arc torch head with the nozzle of FIG. 1. The body 2 of the nozzle is fixed in a nozzle holder 7 and held in place by a nozzle cap 3. An electrode 1 is disposed in the inner cavity of the body 2. Between the electrode 1 and the body 2 there is a plasma gas conduit 4 for plasma gas PG, which flows through the plasma gas conduit 4, then through the space between the electrode 1 and the nozzle and finally out of the nozzle opening 2.28. In addition, the plasma arc torch head is equipped with a nozzle cover guard 5, which is held by a nozzle cover guard bracket 8. Disposed between the nozzle cap 3 and the nozzle cover guard 5 there is a secondary gas conduit 6 for secondary gas SG. The secondary gas SG flows through openings (not shown) in the secondary gas conduit 6, then through the space between the nozzle cap 3 and the nozzle cover guard 5 and finally out of the front opening 5.1 in the nozzle cover guard 5. It is also possible for the nozzle and nozzle cap 3 to consist of one part. There are also plasma arc torch heads which are operated without a secondary gas. As a rule, these then have no nozzle cover guard, no nozzle cover guard bracket and no secondary gas conduit.

The coolant flows via the coolant intake WV through the nozzle holder 7, flows through the space 10 between the nozzle holder 7 and the nozzle, and then flows through the channels B13 of the nozzle into the space between the nozzle and the nozzle cap 3, before flowing back again through the coolant return line WR.

The first portion 2.1 of the body 2 is inserted in the nozzle holder 7. In the process, an axial stop face B11 of the body 2 encounters an axial stop face B71 of the nozzle holder 7. In this way, the positioning of the nozzle or the body along the longitudinal axis M of the plasma arc torch head is determined. The centering surface A11 of the body 2 and the centering surface A71 of the nozzle holder 7 determine the centering of the nozzle or the body 2 in the nozzle holder 7. With this arrangement, good centering is achieved. As already described, the coolant flows through the space 10 between the nozzle holder 7 and the nozzle or body 2. That space is delimited here by the surfaces A71 of the nozzle holder 7 and A13 of the nozzle and by the O-ring 2.42 in the groove 2.10 and the stop faces B11 and B71 and surrounds the entire outer circumference of that nozzle portion here. As a result, the large outer surface A13 of the nozzle is in contact with the coolant, which improves the cooling. It also becomes clear here that with the solution of the invention, damage to the O-ring 2.42 in groove 2.10 is avoided. This is particularly important when there are, for example, projections on the centering surface A71.

FIG. 5 shows a liquid-cooled plasma arc torch head with the nozzle of FIG. 2.

The body 2 of nozzle is fixed in a nozzle holder 7 and is held in place by a nozzle cap 3. An electrode 1 is disposed in the inner cavity of the body 2. Between the electrode 1 and the body 2 there is a plasma gas conduit 4 for plasma gas PG, which flows through the plasma gas conduit 4, then through the space between the electrode 1 and the nozzle and finally out of the nozzle opening 2.28. In addition, the plasma arc torch head is equipped with a nozzle cover guard 5, which is held by a nozzle cover guard bracket 8. Disposed between the nozzle cap 3 and the nozzle cover guard 5 there is a secondary gas conduit 6 for secondary gas SG. The secondary gas SG flows through openings (not shown) in the secondary gas conduit 6, then through the space between the nozzle cap 3 and the nozzle cover guard 5 and finally out of the front opening 5.1 in the nozzle cover guard 5. It is also possible for the nozzle and nozzle cap 3 to consist of one part. There are also plasma arc torch heads which are operated without a secondary gas. As a rule, these then have no nozzle cover guard, no nozzle cover guard bracket and no secondary gas conduit.

As was also discussed in connection with FIG. 3, the nozzle used in the plasma arc torch head of FIG. 6 is similar to the nozzle of FIG. 2, but there are also differences, in this example specifically with regard to the seal in the front region. There is neither a groove 2.38 nor an O-ring 2.40 inserted in it as with the nozzle of FIG. 2 or 5. Since indirect operation is also possible, current and heat transfer in the contact area between the nozzle and the nozzle cap is particularly important because of possible high currents, which are usually greater than 100 A.

The coolant flows via the coolant intake WV through the nozzle holder 7, flows through the space 10 between the nozzle holder 7 and the nozzle, which is formed by the groove 2.11 and the centering surface A71, and then flows through the groove B12 of the nozzle or the body 2, which is in fluid connection with the groove 2.11. and into the space between the nozzle and the nozzle cap 3, before flowing back again through the coolant return line WR.

The centering is even better with the arrangements according to FIGS. 5 and 6 than in FIG. 4, since the nozzle is centred via the surfaces A11 and A12 with the area A71 of the nozzle holder 7. The contact area between the nozzle or the body 2 and the nozzle holder 7 is larger, which additionally the transfer of heat and also the transfer of current between the nozzle and the nozzle holder 7. Again, there is no damage to the O-ring 2.42 in the groove 2.10 (see FIG. 3).

The features of the invention disclosed in the above description, in the drawings and in the claims can be essential to implementing the invention in its various embodiments both individually and in any combination.

LIST OF REFERENCE NUMERALS

1 Electrode
2 Body
2.1 First portion
2.10 Groove
2.2 Second portion
2.20 Inner surface
2.22 Outer surface
2.24 Front end
2.26 Rear end
2.28 Nozzle opening
2.30 Projection
2.32 Edge line
2.34 Front projection
2.36 Rear projection
2.38 Groove
2.40 O-ring
2.42 O-ring
3 Nozzle cap
4 Plasma gas conduit
5 Nozzle cover guard
6 Secondary gas conduit
7 Nozzle holder
8 Nozzle cover guard bracket
10 Space
A11 Centering surface
A12 Area
A13 Outer surface
A71 Centering surface
B11 Axial stop face
B12 Groove
B13 Channels
B71 Axial stop face
D11 External diameter
D12 External diameter
D12*a* External diameter
D13 Diameter
D21 External diameter
L Overall axial length
L1 Axial length
L2 Axial length
L12 Length
L13 Length
L14 Length
M Longitudinal axis
M1 Longitudinal axis
WR Coolant return line
WV Coolant intake

The invention claimed is:

1. A nozzle for a liquid-cooled plasma arc torch, comprising:

a body with an overall axial length L, an inner surface and an outer surface, a front and a rear end and a nozzle opening at the front end, wherein the outer surface of the body, beginning at the rear end, has a substantially cylindrical first portion with an axial length L1, in which at the rear end of the body there is a groove for an O-ring or with an O-ring disposed in it, which is delimited towards the rear end of the body by a projection which defines an external diameter D11 of the body, and at the front end there is a centring surface for a nozzle holder which defines an external diameter D12 of the body, and has a second portion with an axial length L2 adjoining it towards the front end, which defines an axial stop face for a nozzle holder at the boundary to the first portion, which defines an external diameter D21 of the body and tapers substantially conically, at least in a part-portion towards the front end of the body, wherein:

D12−D11≥1.5 mm and/or (D12−D11)/D12≥0.07.

2. A nozzle for a liquid-cooled plasma arc torch, comprising:

a body with an overall axial length L, an inner surface and an outer surface, a front and a rear end and a nozzle opening at the front end, wherein the outer surface of the body beginning at the rear end, has a substantially cylindrical first portion with an axial length L1, in which at the rear end of the body there is a groove extending optionally in the circumferential direction for an O-ring or with an O-ring disposed in it which is delimited towards the rear end of the body by a projection which defines an external diameter D11 of the body, and at the front end there is a centring surface for a nozzle holder which defines an external diameter D12 of the body, and has a second portion with an axial length L2 adjoining it towards the front end, which defines an axial stop face for a nozzle holder at the boundary to the first portion, which defines an external diameter D21 of the body and tapers substantially conically, at least in a part-portion towards the front end of the body, wherein for the length L12 of the distance between the axial stop face of the second portion and the closest edge line of the groove and the length L13 of the distance between said edge line and the rear end of the body, the rule is

L12/L13≥3, and/or wherein for the length L12 of the distance between the axial stop face of the second portion and the closest edge line of the groove and the length L1 of the first portion, the rule is

L12/L1≥0.75, and/or wherein the rule is

D12/L1≥2.3.

3. The nozzle as claimed in claim 1, characterised in that the external diameter D12 is the largest external diameter of the first portion.

4. The nozzle as claimed in claim 1, characterised in that the external diameter D21 is the largest external diameter of the second portion.

5. The nozzle as claimed in claim 1, characterised in that the largest external diameter of the first portion is smaller than the largest external diameter of the second portion.

6. The nozzle as claimed in claim 1, characterised in that there is at least one further groove in the outer surface of the first portion.

7. The nozzle as claimed in claim 6, characterised in that the at least one further groove has a cross-sectional area of at least 3 $mm^2$.

8. The nozzle as claimed in claim 6, characterised in that the further groove extends in the circumferential direction of the body.

9. The nozzle as claimed in claim 6, characterised in that the further groove extends in the circumferential direction of the body over an angle in the range from approximately 20° to approximately 360°.

10. The nozzle as claimed in claim 6, characterised in that the further groove is delimited towards the front end of the body by a front projection which runs in the circumferential direction of the body and whose outer surface is formed by the centring surface, and/or the further groove is delimited towards the rear end of the body by a rear projection running in the circumferential direction of the body.

11. The nozzle as claimed in claim 10, characterised in that the front projection defines an external diameter or a local largest external diameter of the body and the rear projection defines an external diameter or a local largest external diameter, wherein the external diameters or local largest external diameters of the front and rear projections are the same size or differ from one another by a maximum of approximately 0.2 mm.

12. The nozzle as claimed in claim 1, characterised in that there is/are in the second portion of the outer surface at least one groove and/or drilled hole and/or indentation and/or other opening and/or a channel, which is/are in fluid connection with the first portion of the outer surface.

13. The nozzle as claimed in claim 6, characterised in that there is/are in the second portion of the outer surface at least one groove and/or drilled hole and/or indentation and/or other opening and/or a channel, which is/are in fluid connection with the further groove in the first portion of the outer surface.

14. The nozzle as claimed in claim 1, characterised in that on the outer surface of the body between the groove for an O-ring or with an O-ring disposed in it and the axial stop face there is a peripheral receiving region for connecting to a nozzle holder.

15. The nozzle as claimed in claim 6, characterised in that on the outer surface of the body between the groove for an O-ring or with an O-ring disposed in it and the further groove there is a peripheral receiving region for connecting to a nozzle holder.

16. The nozzle as claimed in claim 14, characterised in that the receiving region has at least one radial projection and/or at least one radial indentation.

17. An assembly of a nozzle holder and a nozzle as claimed in claim 1.

18. The assembly as claimed in claim 17, characterised in that the nozzle holder has on its connecting side a cylinder wall with a retaining ring surface resting on the axial stop face of the nozzle and with an inner surface resting on the centring surface of the nozzle.

19. The assembly as claimed in claim 17, characterised in that on the inner surface of the cylinder wall, the nozzle holder has a receiving region complementary to the receiving region of the nozzle.

20. A liquid-cooled plasma arc torch, comprising a nozzle as claimed in claim 1.

21. A liquid-cooled plasma arc torch, comprising a nozzle as claimed in claim 1.

22. The nozzle as claimed in claim 2, wherein:

D12−D11≥1.5 mm and/or (D12−D11)/D12≥0.07.

23. The nozzle of claim 1, wherein the groove at the rear end of the body extends in the circumferential direction.

* * * * *